US012101553B2

(12) United States Patent
Yin et al.

(10) Patent No.: US 12,101,553 B2
(45) Date of Patent: Sep. 24, 2024

(54) CAMERA FOCUSING METHOD AND SYSTEM

(71) Applicant: SHANGHAI INTEGRATED CIRCUIT MANUFACTURING INNOVATION CENTER CO., LTD., Shanghai (CN)

(72) Inventors: Rui Yin, Shanghai (CN); Min Xu, Shanghai (CN); Wei Zhang, Shanghai (CN)

(73) Assignee: SHANGHAI INTEGRATED CIRCUIT MANUFACTURING INNOVATION CENTER CO., LTD., Shanghai (CN)

( * ) Notice: Subject to any disclaimer, the term of this patent is extended or adjusted under 35 U.S.C. 154(b) by 0 days.

(21) Appl. No.: 17/924,041

(22) PCT Filed: Feb. 18, 2022

(86) PCT No.: PCT/CN2022/076718
§ 371 (c)(1),
(2) Date: Nov. 8, 2022

(87) PCT Pub. No.: WO2022/252696
PCT Pub. Date: Dec. 8, 2022

(65) Prior Publication Data
US 2024/0223896 A1 Jul. 4, 2024

(30) Foreign Application Priority Data

May 31, 2021 (CN) .......................... 202110596688.4

(51) Int. Cl.
*H04N 5/335* (2011.01)
*G06T 7/571* (2017.01)
*G06T 7/90* (2017.01)
*H04N 23/67* (2023.01)
*H04N 23/959* (2023.01)

(52) U.S. Cl.
CPC ............. *H04N 23/67* (2023.01); *G06T 7/571* (2017.01); *G06T 7/90* (2017.01); *H04N 23/959* (2023.01); *G06T 2207/10004* (2013.01)

(58) Field of Classification Search
CPC .................................................. H04N 23/959
See application file for complete search history.

(56) References Cited

U.S. PATENT DOCUMENTS 11,539,873 B2 * 12/2022 Park ..................... H04N 17/002
11,650,292 B2 * 5/2023 Zhang ................. H01S 5/02257
356/4.01

\* cited by examiner

*Primary Examiner* — Gary C Vieaux
(74) *Attorney, Agent, or Firm* — Ziegler IP Law Group LLC.

(57) ABSTRACT

The present invention provides a camera focusing method, including: making an imaging plane of a time-of-flight (ToF) camera and that of a red-green-blue (RGB) camera located in a common plane, obtaining a pixel column difference, a pixel matching table, and a corresponding area, calculating an average depth value of the corresponding area, calculating an adjustment distance according to the average depth value and a lens focal length, and adjusting a distance between a lens center and the imaging plane according to the adjustment distance to focus the cameras and improve a focusing speed. The present invention further provides a camera focusing system for implementing the camera focusing method.

5 Claims, 2 Drawing Sheets

CAMERA FOCUSING METHOD AND SYSTEM

CROSS-REFERENCE TO RELATED APPLICATIONS

The present application claims the benefit and priority of Chinese Patent Application No. 2021105966884, filed on May 31, 2021, the disclosure of which is incorporated by reference herein in its entirety as part of the present application.

FIELD OF TECHNOLOGY

The present invention relates to the field of camera focusing technologies, and in particular to a camera focusing method and a camera focusing system.

BACKGROUND

Lens focusing refers to that an image, after passing through the lens, is clearly imaged on the surface of the De Cromon temperature sensor. When the focal length is fixed, objects at different distances are imaged before and after the sensor surface, and are blurred. Therefore, when objects at different distances are shot, the focal length needs to be adjusted to make the image clear. The autofocus requires the camera to automatically determine whether the image is clear.

In the existing automatic focusing method, the sharpness of a red-green-blue (RGB) image is first calculated, and then the voice coil motor is adjusted forward and backward to maximize the sharpness of the target image, so as to determine the required focal length. The focusing speed depends on the speed of the voice coil motor. The existing method is to rotate the motor forward and backward at the same time, which at least doubles the time, and the automatic focusing speed is relatively slow.

Therefore, it is necessary to provide a new camera focusing method and system to resolve the above problems existing in the related art.

SUMMARY

An objective of the present invention is to provide a camera focusing method and system, thereby improving a focusing speed.

To achieve the foregoing objective, the camera focusing method of the present invention includes the following steps:

S1: adjusting positions of a time-of-flight (ToF) camera and a RGB camera, to make an imaging plane of the ToF camera and that of the RGB camera located in a common plane;

S2: multiplying baseline lengths of the ToF camera and the RGB camera with a focal length of the ToF camera to obtain a first process value, and then dividing the first process value by a pixel depth value of an image shot by the ToF camera to obtain a pixel column difference;

S3: establishing a pixel matching table between the ToF camera and the RGB camera according to the pixel column difference;

S4: obtaining a focus area in an image shot by the RGB camera, and querying, according to the pixel matching table, a corresponding area of the focus area in the image shot by the ToF camera;

S5: calculating an average depth value of the corresponding area;

S6: calculating an adjustment distance according to the average depth value and a lens focal length; and S7: adjusting a distance between a lens center and the imaging plane according to the adjustment distance to focus the cameras.

The camera focusing method has the following beneficial effects: A pixel matching table between the ToF camera and the RGB camera is established according to the pixel column difference, to obtain the focus area in the image shot by the RGB camera. Then, the corresponding area of the focus area in the image shot by the ToF camera is queried according to the pixel matching table. Subsequently, an average depth value of the corresponding area is calculated, and an adjustment distance is calculated according to the average depth and a lens focal length. Next, a distance between the lens center and the imaging plane is adjusted according to the adjustment distance to focus the cameras and improve the focusing speed.

Preferably, in step S1, an internal and external parameter calibration is used to make the imaging plane of the ToF camera and that of the RGB camera located in a common plane, which is beneficial to subsequently calculating the pixel column difference.

Preferably, in step S2, the pixel column difference is obtained through calculation according to a formula $d = B \times f/Z$, where d represents the pixel column difference, B represents the baseline lengths of the ToF camera and the RGB camera, f represents the focal length of the ToF camera, and Z represents the pixel depth value.

Preferably, in step S6, the adjustment distance is calculated according to a formula $1/u + 1/v = 1/f$, where u represents the average depth value, f represents the lens focal length of the RGB camera, and v represents the adjustment distance.

The present invention further provides a camera focusing system, including an initial adjustment unit, a pixel column difference calculation unit, a pixel matching table calculation unit, a corresponding area obtaining area, an average depth value calculation unit, an distance adjustment calculation unit, and a focus adjustment unit, where the initial adjustment unit is configured to adjust positions of a ToF camera and a RGB camera to make an imaging plane of the ToF camera and that of the RGB camera located in a common plane, the pixel column difference calculation unit is configured to multiply baseline lengths of the ToF camera and the RGB camera with a focal length of the ToF camera, to obtain a first process value, and then divide the first process value by a pixel depth value of an image shot by the ToF camera to obtain a pixel column difference, the pixel matching table calculation unit is configured to establish a pixel matching table between the ToF camera and the RGB camera according to the pixel column difference, the corresponding area obtaining unit is configured to obtain a focus area in an image shot by the RGB camera, and query, according to the pixel matching table, a corresponding area of the focus area in the image shot by the ToF camera, the average depth value calculation unit is configured to calculate an average depth value of the corresponding area, the distance adjustment calculation unit is configured to calculate an adjustment distance according to the average depth value and a lens focal length, and the focus adjustment unit is configured to adjust a distance between a lens center and the imaging plane according to the adjustment distance to focus the cameras.

The camera focusing system has the following beneficial effects: The pixel matching table calculation unit is configured to establish a pixel matching table between the ToF camera and the RGB camera according to the pixel column difference. The corresponding area obtaining unit is configured to obtain a focus area in an image shot by the RGB camera, and query, according to the pixel matching table, a corresponding area of the focus area in the image shot by the ToF camera. The average depth value calculation unit is configured to calculate an average depth value of the corresponding area. The distance adjustment calculation unit is configured to calculate an adjustment distance according to the average depth value and a lens focal length. The focus adjustment unit is configured to adjust a distance between a lens center and the imaging plane according to the adjustment distance to focus the cameras and improve the focusing speed.

DETAILED DESCRIPTION OF THE EMBODIMENTS

Figure 1:
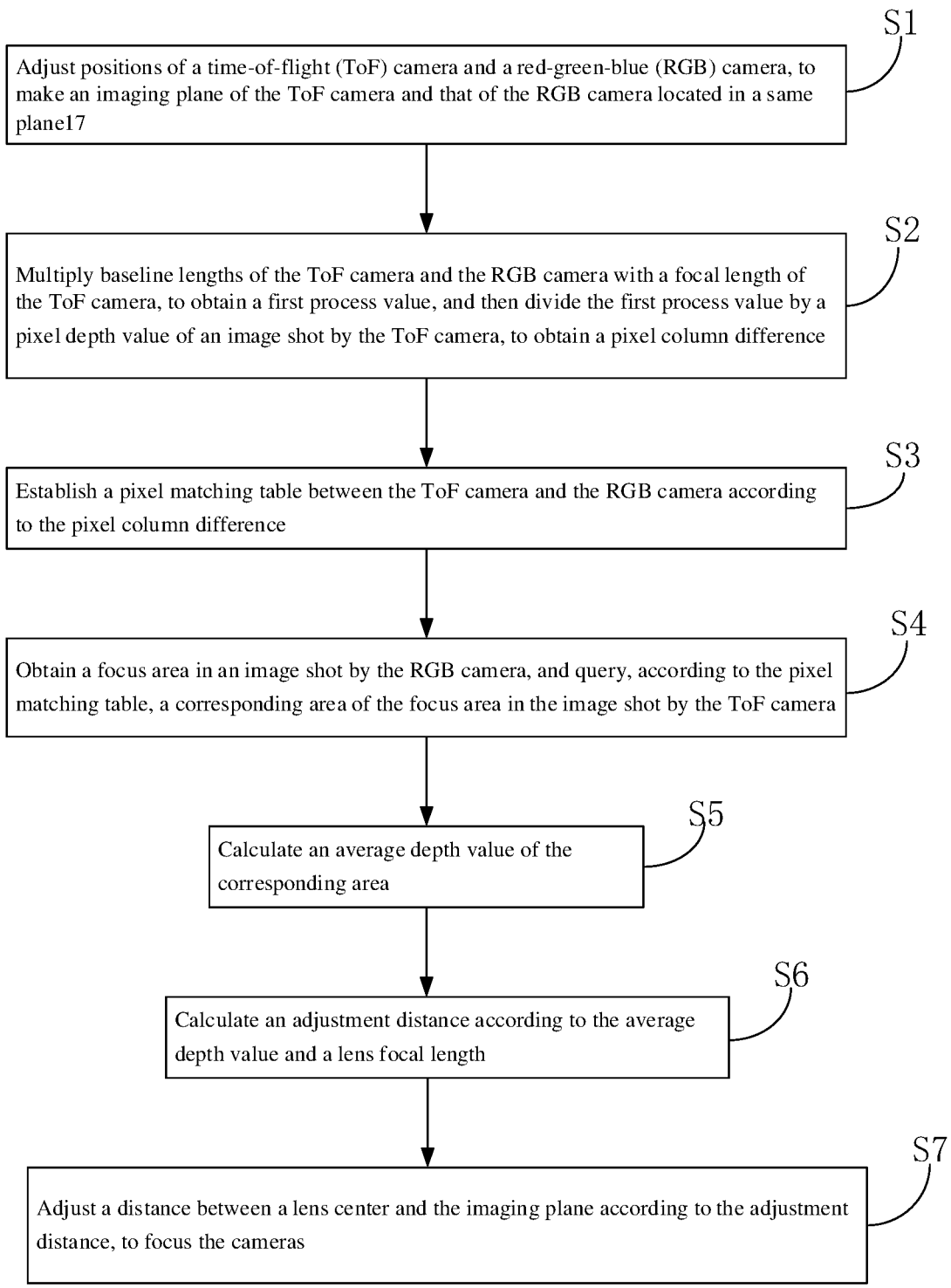
FIG. 1 is a flowchart of a camera focusing method according to the present invention.

In order to make objectives, technical solutions, and advantages of the invention clearer, the technical solutions in the present invention are described clearly and completely in the following with reference to accompanying drawings in the embodiments of the present invention. Apparently, the described embodiments are only some rather than all of the embodiments of the present invention. On the basis of the embodiments of the present invention, all other embodiments acquired by those of ordinary skill in the art without making inventive efforts fall within the scope of protection of the present invention. Unless otherwise mentioned, all technical and scientific terms used herein have the same meaning as commonly understood by one of ordinary skill in the art to which the present invention belong. Terms such as "include" used herein means that the element or item appearing before the term encompass the elements or items listed after the term and their equivalents, without excluding other elements or items.

To resolve the problem in the related art, embodiments of the present invention provide a camera focusing method, including the following steps:

S1: Adjust positions of a time-of-flight (ToF) camera and a RGB camera, to make an imaging plane of the ToF camera and that of the RGB camera located in a common plane;

S2: Multiply baseline lengths of the ToF camera and the RGB camera with a focal length of the ToF camera to obtain a first process value, and then dividing the first process value by a pixel depth value of an image shot by the ToF camera to obtain a pixel column difference;

S3: Establish a pixel matching table between the ToF camera and the RGB camera according to the pixel column difference;

S4: Obtain a focus area in an image shot by the RGB camera, and query, according to the pixel matching table, a corresponding area of the focus area in the image shot by the ToF camera;

S5: Calculate an average depth value of the corresponding area;

S6: Calculate an adjustment distance according to the average depth value and a lens focal length; and S7: Adjust a distance between a lens center and the imaging plane according to the adjustment distance to focus the camera.

A pixel matching table between the ToF camera and the RGB camera is established according to the pixel column difference to obtain the focus area in the image shot by the RGB camera. Then, the corresponding area of the focus area in the image shot by the ToF camera is queried according to the pixel matching table. Subsequently, an average depth value of the corresponding area is calculated, and an adjustment distance is calculated according to the average depth and a lens focal length. Next, a distance between the lens center and the imaging plane is adjusted according to the adjustment distance to focus the cameras and improve the focusing speed.

In some embodiments of the present invention, in step S1, an internal and external parameter calibration is used to make the imaging plane of the ToF camera and that of the RGB camera located in a common plane, which is beneficial to subsequently calculating a pixel column difference.

In some embodiments of the present invention, in step S2, the pixel column difference is obtained through calculation according to a formula $d=B\times f/Z$, where d represents the pixel column difference, B represents the baseline lengths of the ToF camera and the RGB camera, f represents the focal length of the ToF camera, and Z represents the pixel depth value. Specifically, the pixel column difference is calculated according to a formula $d=(B\times f)/Z$, where d represents the pixel column difference, B represents the baseline lengths of the ToF camera and the RGB camera, f represents the focal length of the ToF camera, and Z represent the pixel depth value.

In some embodiments of the present invention, in step S6, the adjustment distance is calculated according to a formula $1/u+1/v=1/f$, where u represents the average depth value, f represents the lens focal length of the RGB camera, and v represents the adjustment distance.

Figure 2:
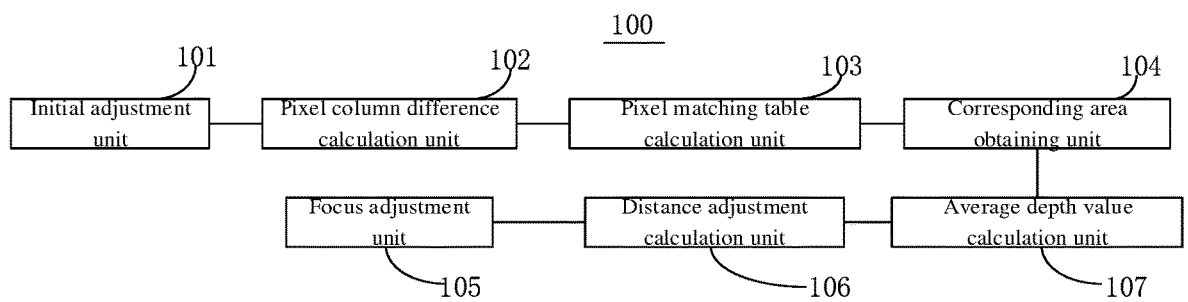
FIG. 2 is a structural block diagram of a camera focusing system according to the present invention.

FIG. 2 is a structural block diagram of a camera focusing system according to some embodiments of the present invention. With reference to FIG. 2, a camera focusing system 100 includes an initial adjustment unit 101, a pixel column difference calculation unit 102, a pixel matching table calculation unit 103, a corresponding area obtaining unit 104, an average depth value calculation unit 105, an distance adjustment calculation unit 106, and a focus adjustment unit 107, where the initial adjustment unit 101 is configured to adjust positions of a ToF camera and a RGB camera to make an imaging plane of the ToF camera and that of the RGB camera located in a common plane, the pixel column difference calculation unit 102 is configured to multiply baseline lengths of the ToF camera and the RGB camera with a focal length of the ToF camera to obtain a first process value, and then divide the first process value by a pixel depth value of an image shot by the ToF camera to obtain a pixel column difference, the pixel matching table calculation unit 103 is configured to establish a pixel matching table between the ToF camera and the RGB camera according to the pixel column difference, the corresponding area obtaining area 104 is configured to obtain a focus area in an image shot by the RGB camera, and query, according to the pixel match table, a corresponding area of the focus area in the image shot by the ToF camera, the average depth value calculation unit 105 is configured to calculate an average depth value of the corresponding area, the distance adjustment calculation unit 106 is configured to calculate an adjustment distance according to the average depth value and a lens focal length, and the focus adjustment unit 107 is configured to adjust a distance between a lens center and the imaging plane according to the adjustment distance to focus the cameras.

The pixel matching table calculation unit is configured to establish a pixel matching table between the ToF camera and the RGB camera according to the pixel column difference. The corresponding area obtaining unit is configured to obtain a focus area in an image shot by the RGB camera, and query, according to the pixel matching table, a corresponding area of the focus area in the image shot by the ToF camera. The average depth value calculation unit is configured to calculate an average depth value of the corresponding area. The distance adjustment calculation unit is configured to calculate an adjustment distance according to the average depth value and a lens focal length. The focus adjustment unit is configured to adjust a distance between a lens center and the imaging plane according to the adjustment distance to focus the cameras and improve the focusing speed.

Although the embodiments of the present invention are described in detail, it is apparent to those skilled in the art that various modifications and changes can be made to the embodiments. However, it should be understood that such modifications and variations are within the scope and spirit of the present invention as described in the appended claims. Furthermore, the present invention described herein is susceptible to other embodiments and may be embodied or carried out in various ways.

The invention claimed is:
1. A camera focusing method, comprising the following steps:
   S1: adjusting positions of a time-of-flight (ToF) camera and a red-green-blue (RGB) camera, to make an imaging plane of the ToF camera and that of the RGB camera located in a common plane;
   S2: multiplying baseline lengths of the ToF camera and the RGB camera with a focal length of the ToF camera to obtain a first process value, and then dividing the first process value by a pixel depth value of an image shot by the ToF camera to obtain a pixel column difference;
   S3: establishing a pixel matching table between the ToF camera and the RGB camera according to the pixel column difference;
   S4: obtaining a focus area in an image shot by the RGB camera, and querying, according to the pixel matching table, a corresponding area of the focus area in the image shot by the ToF camera;
   S5: calculating an average depth value of the corresponding area;
   S6: calculating an adjustment distance according to the average depth value and a lens focal length; and
   S7: adjusting a distance between a lens center and the imaging plane according to the adjustment distance to focus the cameras.

2. The camera focusing method according to claim 1, wherein in step S1, an internal and external parameter calibration is used to make the imaging plane of the ToF camera and that of the RGB camera located in a common plane.

3. The camera focusing method according to claim 1, wherein in step S2, the pixel column difference is obtained through calculation according to a formula, $d=B\times f/Z$, wherein d represents the pixel column difference, B represents the baseline lengths of the ToF camera and the RGB camera, f represents the focal length of the ToF camera, and Z represents the pixel depth value.

4. The camera focusing method according to claim 1, wherein in step S6, the adjustment distance is calculated according to a formula, $1/u+1/v=1/f$, wherein u represents the average depth value, f represents the lens focal length of the RGB camera, and v represents the adjustment distance.

5. A camera focusing system, configured to implement the camera focusing method according to claim 1, and comprising an initial adjustment unit, a pixel column difference calculation unit, a pixel matching table calculation unit, a corresponding area obtaining area, an average depth value calculation unit, an distance adjustment calculation unit, and a focus adjustment unit, wherein the initial adjustment unit is configured to adjust positions of a ToF camera and a RGB camera to make an imaging plane of the ToF camera and that of the RGB camera located in a common plane, the pixel column difference calculation unit is configured to multiply baseline lengths of the ToF camera and the RGB camera with a focal length of the ToF camera, to obtain a first process value, and then divide the first process value by a pixel depth value of an image shot by the ToF camera to obtain a pixel column difference, the pixel matching table calculation unit is configured to establish a pixel matching table between the ToF camera and the RGB camera according to the pixel column difference, the corresponding area obtaining unit is configured to obtain a focus area in an image shot by the RGB camera, and query, according to the pixel matching table, a corresponding area of the focus area in the image shot by the ToF camera, the average depth value calculation unit is configured to calculate an average depth value of the corresponding area, the distance adjustment calculation unit is configured to calculate an adjustment distance according to the average depth value and a lens focal length, and the focus adjustment unit is configured to adjust a distance between a lens center and the imaging plane according to the adjustment distance to focus the cameras.

* * * * *